(12) United States Patent
Aykac et al.

(10) Patent No.: US 10,168,439 B1
(45) Date of Patent: Jan. 1, 2019

(54) DATA CORRECTING USING PHOTOPEAK MONITORING DURING IMAGING

(71) Applicant: Siemens Medical Solutions USA, Inc., Malvern, PA (US)

(72) Inventors: Mehmet Aykac, Knoxville, TN (US); Vladimir Y. Panin, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 8 days.

(21) Appl. No.: 15/703,150

(22) Filed: Sep. 13, 2017

(51) Int. Cl.
| G01D 18/00 | (2006.01) |
| G01T 7/00 | (2006.01) |
| G01T 1/202 | (2006.01) |
| G01T 1/164 | (2006.01) |
| G01T 3/00 | (2006.01) |

(52) U.S. Cl.
CPC ............ G01T 7/005 (2013.01); G01T 1/1648 (2013.01); G01T 1/202 (2013.01); G01T 3/001 (2013.01)

(58) Field of Classification Search
CPC ......... G01T 1/00; G01T 7/005; G01T 1/1648; G01T 1/202; G01T 3/001
See application file for complete search history.

(56) References Cited

U.S. PATENT DOCUMENTS

| 6,288,399 B1 * | 9/2001 | Andreaco | ............. G01T 1/1642 250/363.03 |
| 8,153,983 B1 * | 4/2012 | Shah | ....................... G01T 1/202 250/361 R |
| 2010/0102215 A1 * | 4/2010 | Liang | ....................... G01T 1/00 250/252.1 |
| 2015/0378047 A1 * | 12/2015 | Chen | .................... G01V 5/0041 378/5 |

OTHER PUBLICATIONS

Daube-Witherspoon, M.E et al., "Unified Deadtime Correction Model for PET", IEEE Transactions on Medical Imaging, vol. 10, No. 3, Sep. 1991, pp. 267-275.
Germano, G. et al., "A study of Data Loss and Mispositioning due to Pileup in 2D Detectors in PET", IEEE Transactions on Nuclear Science, vol. 37, No. 2, Apr. 1990, pp. 671-675.

* cited by examiner

*Primary Examiner* — Kiho Kim (57) ABSTRACT

A method of scanner correction includes obtaining a first photopeak location for a first crystal in a detector. Image data is received from the first crystal. The first crystal generates the image data during a current imaging procedure. The image data is processed using the first photopeak location. A second photopeak location is determined for the first crystal from the image data. A difference between the first photopeak location and the second photopeak location of the first crystal is determined and the image data is reprocessed using the second photopeak location when the difference between the first photopeak location and the second photopeak location exceeds a predetermined threshold. An image is generated using the image data.

20 Claims, 9 Drawing Sheets

DATA CORRECTING USING PHOTOPEAK MONITORING DURING IMAGING

FIELD

Aspects of the present disclosure relate in general to detectors for nuclear imaging, and more particularly to detector correction in nuclear imaging.

BACKGROUND

Nuclear imaging, such as positron emission tomography (PET), generates imaging data based on receipt of annihilation photons at photo detectors during imaging. The photodetectors include crystals each having an energy response (photopeak) to a received photon. In an ideal imaging device, the photopeak response of each crystal remains stable. However, in actual applications, the photopeak response of each crystal can vary from scan to scan and/or during the course of a scan, for example, due to count rate changes or environmental changes. Properly tuned scanners and data correction methods are required to obtain accurate quantitative images.

Current imaging systems utilize a set-up and calibration process that is performed prior to performing a plurality of scans. For example, in some instances, an imaging device is calibrated once per day. Because the photopeak locations of the detectors can vary, the imaging device can be less accurate during subsequent scans. It is not practical to perform current calibration processes prior to each scan (due to time constraints, training, etc.), and artifacts can be introduced due to photopeak variation in patient/phantom scans.

SUMMARY

In various embodiments, a method of scanner correction includes obtaining a first photopeak location for at least one crystal in a detector. Image data is received from the at least one crystal. The at least one crystal generates the image data during a current imaging procedure. The image data is processed using the first photopeak location. A second photopeak location is determined for the at least one crystal from the image data. A difference between the first photopeak location and the second photopeak location is determined and the image data is reprocessed using the second photopeak location when the difference between the first photopeak location and the second photopeak location exceeds a predetermined threshold. An image is generated using the image data.

In various embodiments, a system includes a gantry sized and configured to receive a patient, a scanner including at least one imaging modality configured to detect a plurality of photon events, and a computer in data communication with the at least one imaging modality. The at least one imaging modality includes a plurality of detectors each having a plurality of crystals. The computer is configured to process data for medical imaging and is configured to receive data indicative of a first plurality of events detected by a plurality of crystals, generate first photopeak locations for each of the plurality of crystals from the first plurality of events, receive data indicative of a second plurality of events detected by the plurality of crystals, process the second plurality of events using the first photopeak location, generate second photopeak locations for each of the plurality of crystals from the second plurality of events, determine a difference between the first photopeak location and the second photopeak location for each of the plurality of crystal, reprocess a subset of the second plurality of events corresponding to a selected one of the plurality of crystals using the second photopeak location when the difference between the first photopeak location and the second photopeak location for the selected one of the plurality of crystals exceeds a predetermined threshold, and generate an image using at least the second plurality of events.

In various embodiments, a non-transitory, computer-readable medium encoded with computer executable instructions is disclosed. The computer executable instructions when executed by a computer causes the computer to execute the steps of: receiving a first set of event data for at least one detector of an imaging device, wherein the at least one detector comprises a plurality of crystals; generating a first photopeak location for each of the plurality of crystals based on the first set of event data; receiving a second set of event data for the at least one detector of the imaging device; generating a second photopeak location for each of the plurality of crystals based on the second set of event data; determining a difference between the first photopeak location and the second photopeak location for each of the plurality of crystals; processing the second set of event data, and generating an image using the second set of event data. The second set of event data is processed using the first photopeak location if the difference between the first photopeak location and the second photopeak location is below a predetermined value. The second set of event data is processed using the second photopeak location if the difference between the first photopeak location and the second photopeak location is above a predetermined value.

BRIEF DESCRIPTION OF THE DRAWINGS

The following will be apparent from elements of the figures, which are provided for illustrative purposes and are not necessarily drawn to scale.

DETAILED DESCRIPTION

This description of the exemplary embodiments is intended to be read in connection with the accompanying drawings, which are to be considered part of the entire written description.

Various embodiments of the present disclosure address the foregoing challenges associated with photopeak variations. In various embodiments, a method of monitoring and correcting photopeak variations in a nuclear imaging device is disclosed. Imaging data is received from one or more detectors in the nuclear imaging device. Each of the detectors includes a plurality of crystals. The imaging data is processed based on a previously generated first photopeak location, for example, a photopeak based on an initial setup acquisition. After the initial processing, a second photopeak location is calculated for each of the crystals in the detector during a subsequent scan, such as a patient and/or phantom scan. The second photopeak location corresponds to a photopeak of the respective crystal during acquisition of the imaging data. If the second photopeak location varies from the first photopeak location by at least a predetermined amount, the image data is reprocessed using the second photopeak location. An image is generated from the imaging data. In various embodiments, the second photopeak corresponds to a photopeak location for each crystal during a full scan and/or a partial scan. For example, in some embodiments, a scan is divided into a plurality of time-based frames each corresponding to imaging data received during a specific portion of a scan. The photopeak for each crystal can be calculated for each frame.

Figure 1:
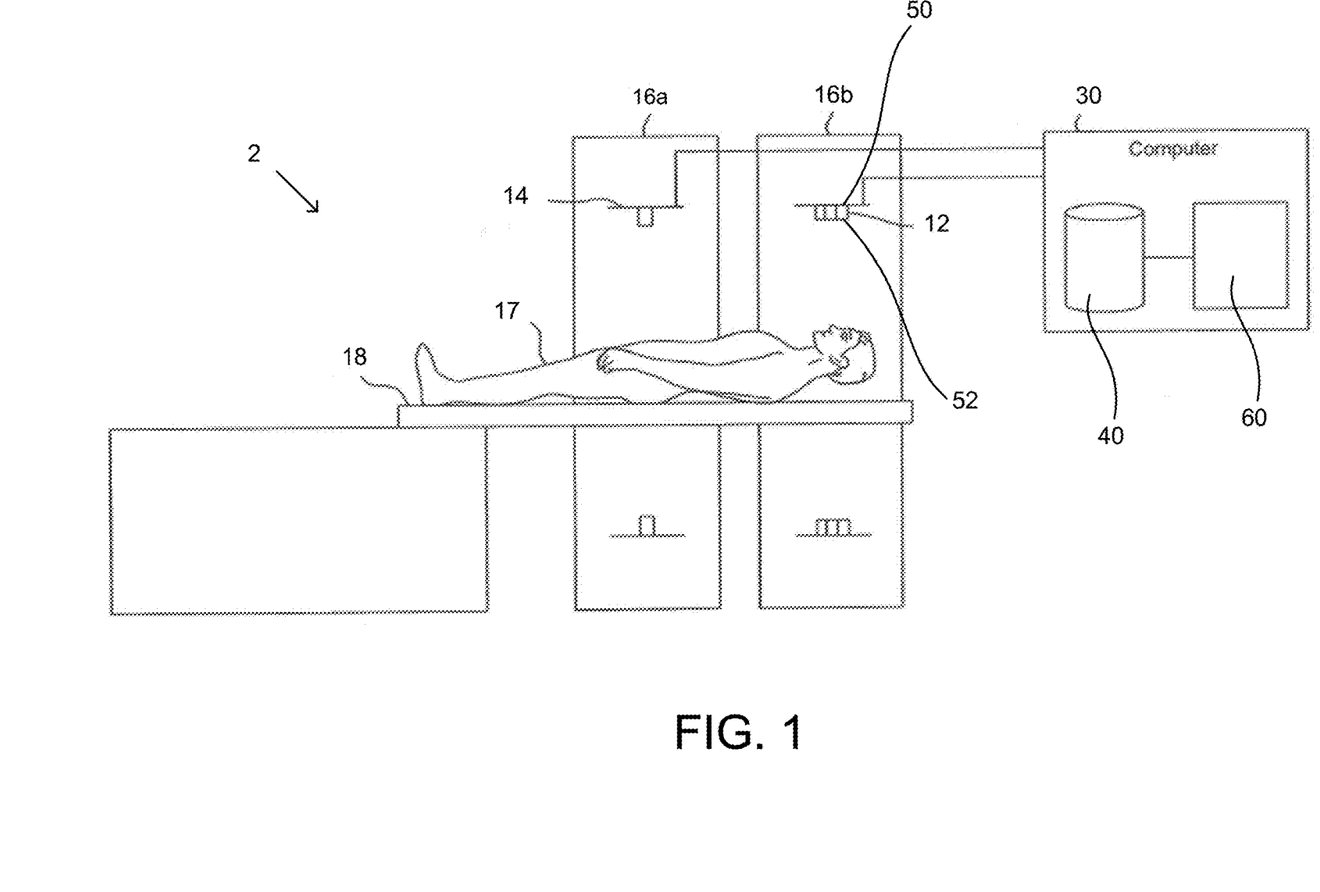
FIG. 1 illustrates a nuclear imaging system, in accordance with some embodiments.

FIG. 1 illustrates one embodiment of a nuclear imaging detector 2. The nuclear imaging detector 2 includes a scanner for at least a first modality 12 provided in a first gantry 16a. The first modality 12 includes a plurality of detectors 50 configured to detect an annihilation photon, gamma ray, and/or other nuclear imaging event. In various embodiments, the first modality 12 is a PET detector. A patient 17 lies on a movable patient bed 18 that may be movable between a gantry. In some embodiments, the nuclear imaging detector 2 includes a scanner for a second imaging modality 14 provided in a second gantry 16b. The second imaging modality 14 can be any suitable imaging modality, such as, for example, computerized tomography (CT), single-photon emission tomography (SPECT) and/or any other suitable imaging modality.

Scan data from the first modality 12 is stored at one or more computer databases 40 and processed by one or more computer processors 60 of a computer 30. The graphical depiction of computer 30 in FIG. 1 is provided by way of illustration only, and computer 30 may include one or more separate computing devices. The imaging data sets can be provided by the first modality 12 and/or may be provided as a separate data set, such as, for example, from a memory coupled to the computer 30. The computer 30 can include one or more processing electronics for processing a signal received from one of the plurality of detectors 50.

Each of the plurality of detectors 50 includes a plurality of crystals 52. Each of the crystals 52 is configured to generate a signal in response to receipt of a photon. Each crystal 52 generates a signal corresponding to the energy level of the received photon. In some embodiments, each of the plurality of detectors 50 includes a block (or matrix) structure having a predetermined number of crystals 52 in an axial and trans-axial direction. As an example, in some embodiments, each of the plurality of detectors 50 includes four rows of crystals 52 in an axial direction with each row including forty-eight crystals 52, although it will be appreciated that any suitable number of rows and/or columns can be selected for each of the plurality of detectors 50.

Each of the crystals 52 has a photopeak response related to the energy transfer between the received photon and the generated signal. For example, in some instances, each of the crystals 52 have an ideal photopeak response of about 511 keV for a PET scan. In non-ideal systems, the photopeak response of each of the crystals 52 can vary, for example, over the course of a single scan, from a first scan to a second scan, and/or over any other period. During a scan, imaging data from each of the crystals 52 is received by the computer 30 and processed to identify photon events, such as coincidence events, singles events, etc. In some embodiments, processing the imaging data includes placing each received signal into a bin based on the energy response of the respective crystal 52, although it will be appreciated that alternative and/or additional groups and/or processing algorithms can be used. Although embodiments are discussed herein including photopeak responses for PET scans, it will be appreciated that the systems and methods discussed herein can apply to any nuclear imaging modality, such as, for example, PET (positron emission tomography), SPECT (single-photon emission computed tomography), CT (computed tomography), MRI (magnetic resonance imaging), and/or any other suitable modality.

Figure 2A:
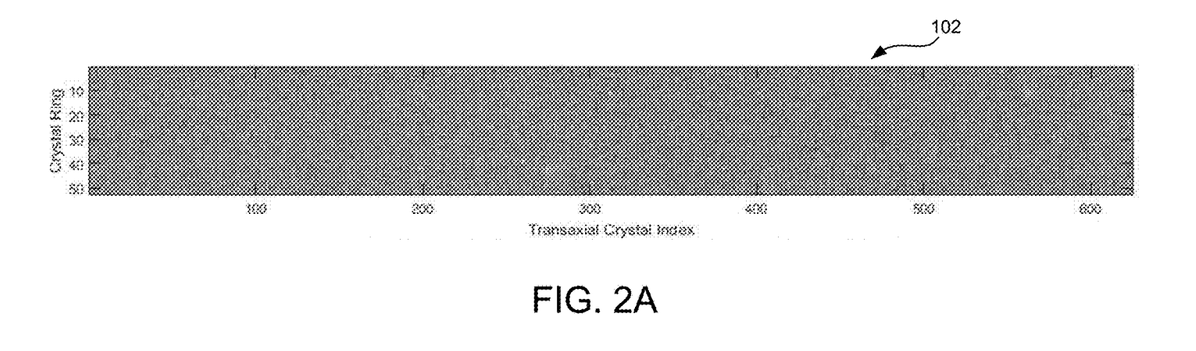
FIG. 2A illustrates photopeak locations of each crystal in a crystal array in a detector of the nuclear imaging system of FIG. 1 immediately following an initial set-up, in accordance with some embodiments.
Figure 2B:
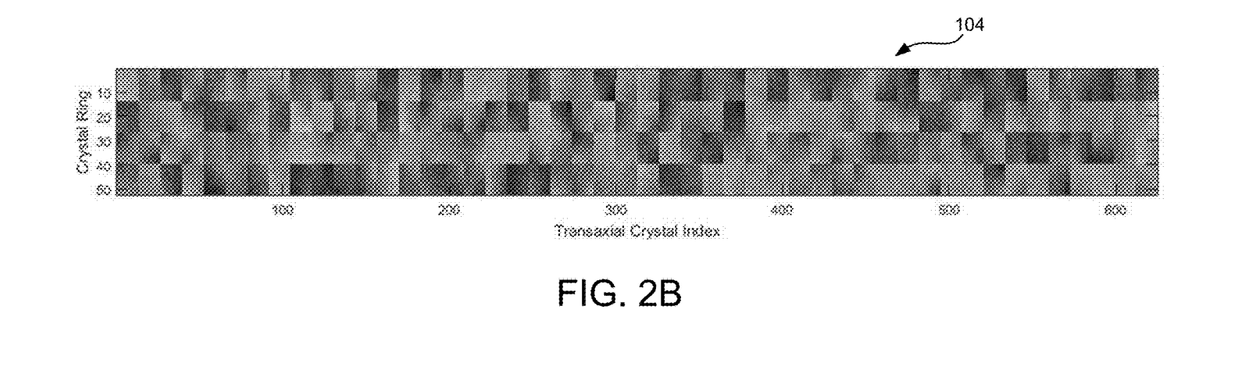
FIG. 2B illustrates photopeak locations of each crystal in the crystal array of FIG. 2A during a subsequent scan, in accordance with some embodiments.

FIGS. 2A and 2B illustrate changes in photopeak locations for a plurality of crystals in a detector 50, in accordance with some embodiments. FIG. 2A is a matrix 102 illustrating photopeak locations for each of the crystals in a detector 50 for a scan performed following an initial setup (or baseline) process. The matrix 102 is relatively uniform as each of the crystals is calibrated with a similar photopeak location at set-up and the photopeak of each crystal remains close to the set-up value during the first scan. FIG. 2B is a matrix 104 illustrating photopeak locations for each of the crystals in the detector 50 during a subsequent scan (i.e., a scan occurring after the initial set-up scan). The matrix 104 is non-uniform due to shifts in photopeak locations for one or more of the crystals in the detector 50 as compared to the initial photopeak locations. Photopeak locations can increase and/or decrease for each individual crystal during one or more scans.

In some embodiments, the shift in photopeak for each of the crystals causes artifacts in a generated image. The amount (or intensity) of a shift in the photopeak can increase the severity of artifacts in an image. In some embodiments, one or more crystals can have an actual photopeak above and/or below an initial photopeak, resulting in misclassification or qualification of events detected by the respective crystal 52. In some embodiments, a crystal 52 can have a photopeak response below an effective detection value such that the crystal 52 cannot adequately detect photon events during a scan. Failure to correct for altered photopeaks and/or defective crystals 52 results in sensitivity loss for particular crystals and/or creations of artifacts in a constructed image.

Figure 3:
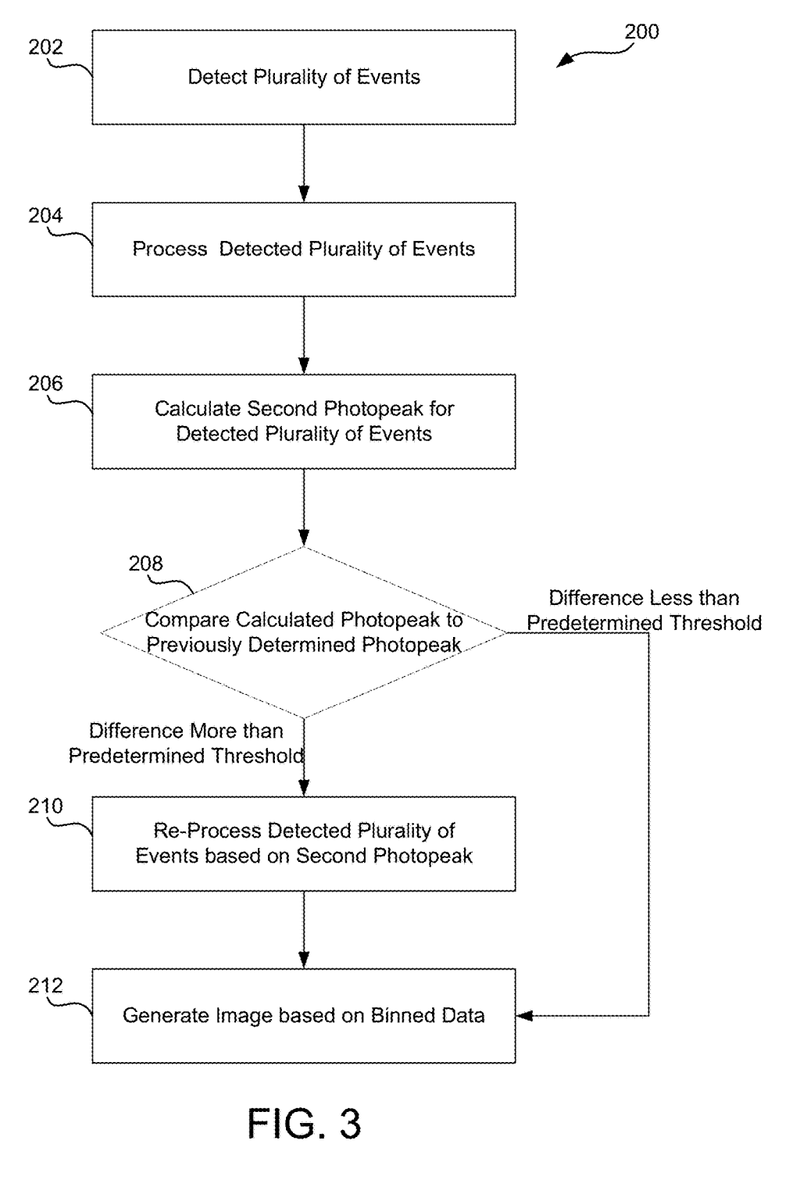
FIG. 3 is a flowchart illustrating a method of monitoring and correcting photopeak variations in a nuclear imaging system, in accordance with some embodiments

FIG. 3 illustrates a method 200 of monitoring and correcting for photopeak variations during a scan, in accordance with some embodiments. At step 202, one or more crystals in a detector 50 detect a plurality of photon events during a scan. In some embodiments, a scan can be divided into two or more partial scans (or frames) each corresponding to a predetermined portion of the scan, such as one-minute frames, two-minute frames, five-minute frames, etc. The plurality of events can include single events, coincidence events, random events, and/or any other suitable events. The one or more crystals 52 generate signals in response to the detected events and transmit the signals to the computer 30. The generated signals have an energy level corresponding to the current operation of the respective crystal 52. In an ideal case, each of the generated signals have a predetermined photopeak location, such as 511 keV during a PET scan. In non-ideal cases, the energy of each of the generated signals can vary from crystal to crystal 52 and/or within a single crystal 52 over multiple events due to variations in detector performance caused by count rate changes and/or environmental factors.

At step 204, the detected events are processed by the computer 30. In some embodiments, the plurality of events are grouped based on an energy level of the event. For example, in some embodiments, an energy window is established for a predetermined time period (corresponding to the imaging scan). The energy window can include an upper energy threshold and a lower energy threshold for signals received from the crystals 52 that are representative of an event. The energy window is centered around a peak energy for a selected crystal 52 during a detected event. For example, in an ideal case, the energy window for a PET scan is centered around an energy of about 511 keV. Each of the groupings (or bins) corresponds to a predetermined portion of the energy window. Grouping of events assists in identifying events received during the imaging scan. For example, in some embodiments, an event having a photopeak within the energy window is classified as a detection event and is compared to events detected by one or more additional detectors to identify coincidence events, random events, single events, etc.)

In some embodiments, the energy window used for initial qualification of the detected events can be predetermined during set-up of the nuclear imaging device 10 and/or based on previous scan data. For example, in some embodiments, the nuclear imaging device 10 undergoes a calibration process including placing a known-source (such as a phantom) on the patient bed 18 and performs a calibration scan for at least the first modality 12. A first (or initial) photopeak and an initial energy window for each of the detectors 50 and/or individual crystals 52 can be calculated based on the initial set-up scan of the known source. In other embodiments, the first photopeak (and associated energy window) can be a photopeak calculated during a prior scan and/or a prior partial scan, as discussed in greater detail below. The initial photopeak locations can be provided to and/or stored by the computer 30.

The detected events can be stored by the computer 30 using any suitable method. For example, in various embodiments, the detected events are stored as energy data in a list-mode format having a predetermined number of bits associated with each event, although it will be appreciated that any suitable data storage scheme can be used.

At step 206, a second photopeak is calculated for each of the plurality of crystals. The second photopeak is calculated from the image data (e.g., the detected events) for the respective crystal 52 during a scan and/or a selected frame. The second photopeak is calculated based on the detected events (image data) received during the scan (or frame) period. The second photopeak can be calculated using any suitable method, such as single events and/or coincidence events, as discussed in greater detail below with respect to FIGS. 6 and 7. The second photopeak corresponds to operational changes of the nuclear imaging device 10 after the initial calibration process. For example, variations in photopeak locations of each of the crystals 52 can occur due to detector related factors, internal factors, environmental factors, and/or other causes.

At step 208, the second photopeak calculated in step 206 is compared to the first (or initial) photopeak. If the second photopeak varies from the initial photopeak by a predetermined amount, the method 200 proceeds to step 210. The predetermined amount can be any predetermined variance, such as a 1%, 2%, 5%, 10%, etc. variation. If the variation between the first and second photopeak is less then predetermined amount, the method 200 proceeds to step 212.

At step 210, the detected events (i.e., the imaging data) is re-processed using the second photopeak and/or a second energy window. For example, in some embodiments, a second energy window is calculated by shifting the upper and/or lower bounds of the first energy window to center the second energy window on the second photopeak. The energy window can be shifted to center on the second photopeak and/or can be expanded or contracted based on the variation between the second photopeak and the first photopeak. The detected events are re-processed (e.g., re-binned) using the second energy window to identify coincidence events, single events, etc.

At step 212, an image is generated based on one or more detected events. The image can be generated using any known method for generating a nuclear image. For example, in some embodiments, a plurality of frames are generated for each scan. Each of the plurality of frames includes a plurality of coincidence events detected during a predetermined time period of the scan. The frames can be combined to generate a complete scan image. Although specific embodiments are discussed herein, it will be appreciated that the image can be generated using any suitable method for generating images from detected events.

Figure 4:
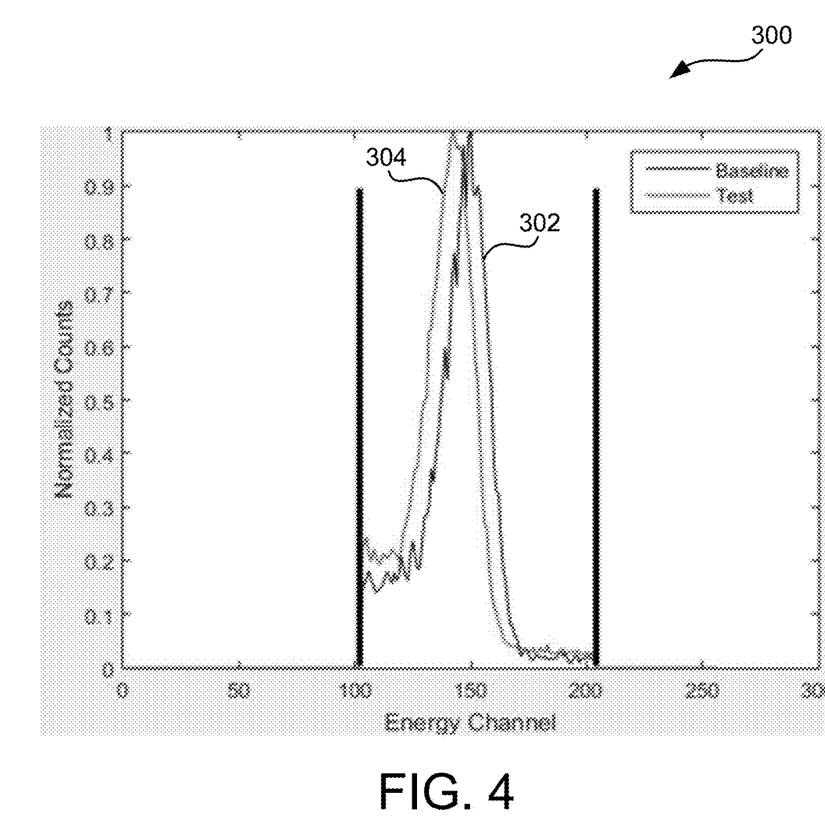
FIG. 4 is a graph illustrating a variance in the photopeak locations for a detector during an initial set-up scan and a subsequent scan, in accordance with some embodiments.

FIG. 4 is a graph 300 illustrating a shift from a first (or baseline) energy window for a first detector 50 to a second energy window, in accordance with some embodiments. The first energy window extends from about 435 keV to about 650 keV. Although specific values are discussed herein, it will be appreciated that the energy window values are not fixed and can be changed according to the energy resolution of one or more detectors 50 in an imaging system. During a scan, detected events are processed using the first energy window of a corresponding crystal. The initial processing generates a first photopeak response curve 302. After completing the scan, a second photopeak (and associated second energy window) is calculated for each of the crystals in the detector 50. The detected events are re-processed using the second energy window. The re-processing of the detected events generates a second photopeak response curve 304. As shown in FIG. 4, the second photopeak response curve 304 is shifted to a lower peak energy as compared to the first photopeak response curve 302. The second photopeak response curve 304 illustrates an actual photopeak response of at least one crystal in the detector 50 during a partial scan. The energy channel has a shift from a channel of about 150 to a channel of about 140. Each of the channels corresponds to about 3.6 keV in the illustrated embodiment.

Figure 5:
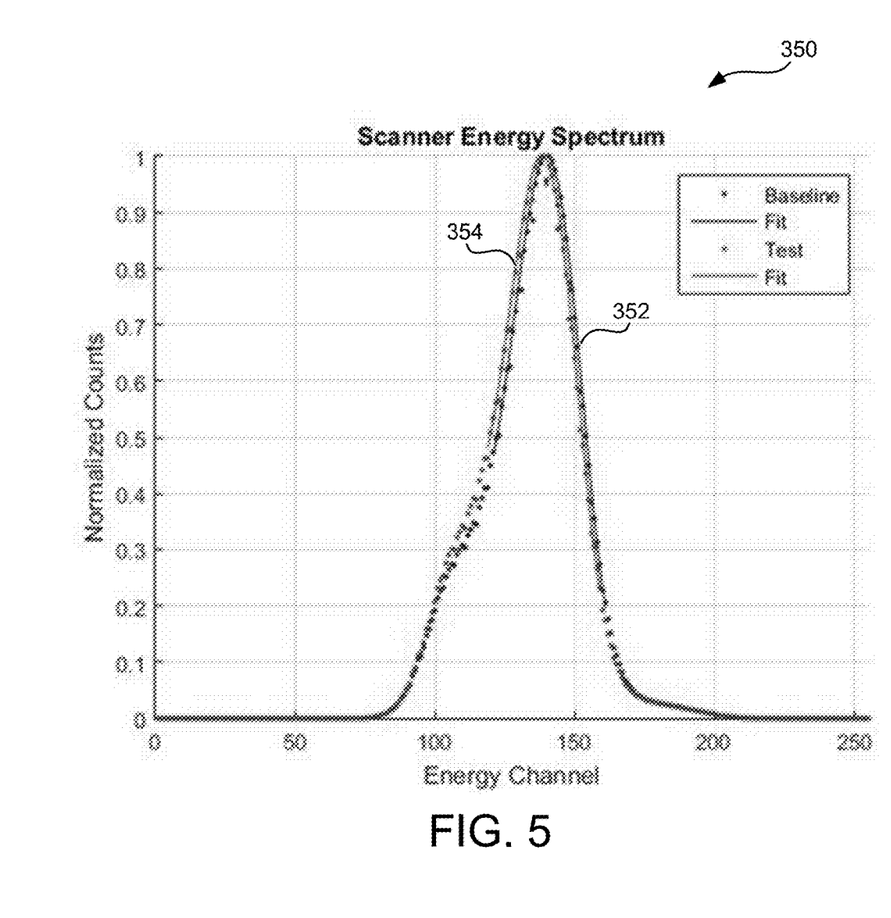
FIG. 5 is a graph illustrating a shift in a scanner energy spectrum between the initial baseline binning and the subsequent time-specific binning, in accordance with some embodiments

FIG. 5 is a graph 350 illustrating a shift in a scanner energy spectrum between an initial grouping of the detected events using the first photopeak location and a subsequent grouping using the second photopeak location, in accordance with some embodiments. As shown in FIG. 5, an initial scanner energy spectrum 352 is calculated from the detected events using the first photopeak. For example, in some embodiments, photopeak locations are calculated using a higher-order polynomial fit, a Gaussian fit, and/or any other suitable method. After re-processing of the detected events, a second scanner energy spectrum 354 is calculated. In the illustrated embodiments, the second scanner energy spectrum 304 has a 6 keV shift from the first scanner energy spectrum 302, although it will be appreciated that a greater and/or lesser shift is possible based on changes in each of the crystal photopeak locations.

Figure 6:
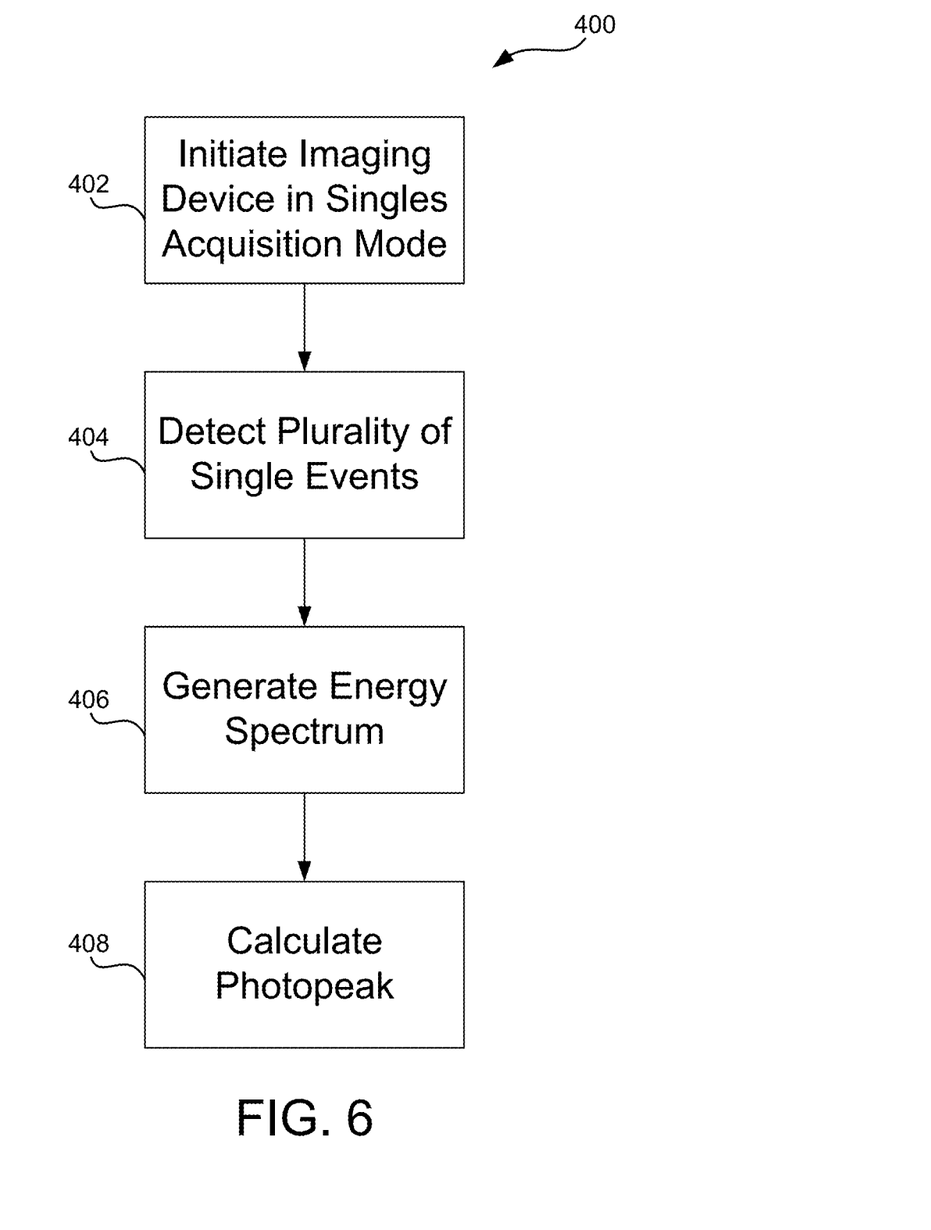
FIG. 6 illustrates a method of generating a photopeak location from singles acquisition data, in accordance with some embodiments.

FIG. 6 illustrates a method 400 of generating a photopeak location from singles acquisition data, in accordance with some embodiments. At step 402, the nuclear imaging device 10 is initiated in a singles acquisition mode. The singles acquisition mode can correspond to a selected modality (e.g., SPECT) and/or can correspond to a calibration mode of the nuclear imaging device 10. At step 404, each of the crystals 52 in one or more detectors 50 detect a plurality of single events. Each detected single event generates a signal that is provided to the computer 30. The computer 30 stores each of the signals using a suitable crystal energy, such as an 8-bit crystal energy.

At step 406, an energy spectrum is generated for each of the crystals 52. The energy spectrum can be generated by grouping (or binning) each of the detected events into one of a plurality of bins. For example, in some embodiments, 256 bins are used to process each of the detected events and generate a crystal energy spectrum.

At step 408, a photopeak is calculated for each of the crystals 52. The photopeak is calculated from the energy spectrum. For example, in some embodiments, the photopeak is calculated by a higher-order polynomial fit, a Gaussian fit, and/or any other suitable method.

Figure 7:
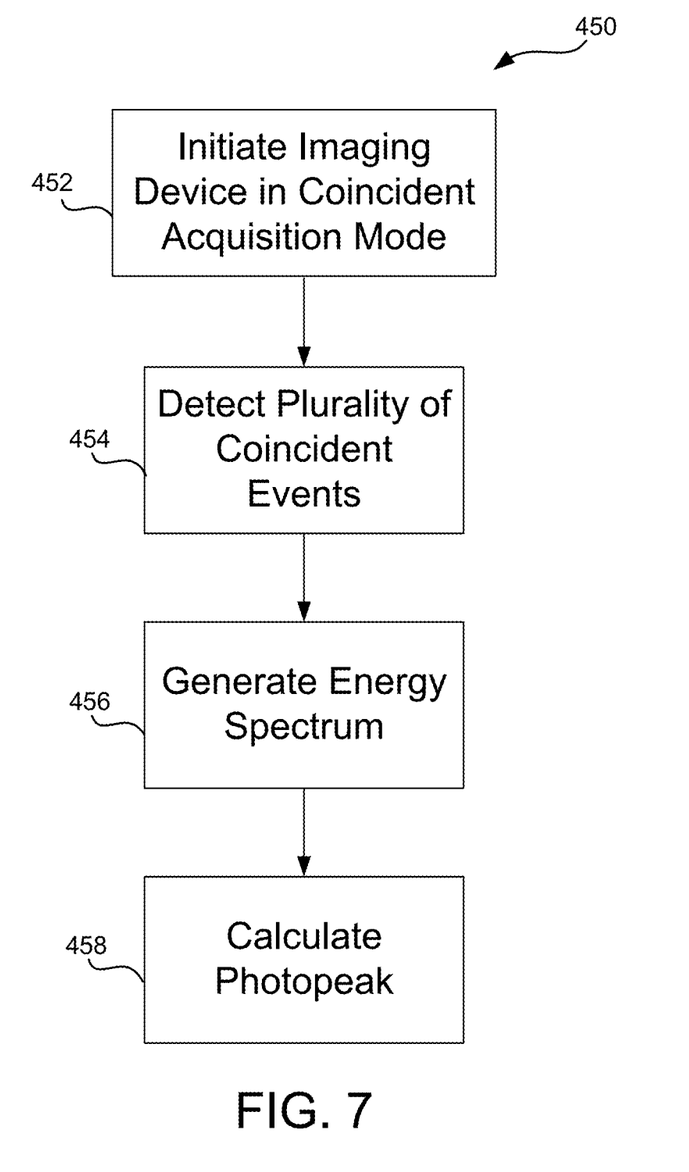
FIG. 7 illustrates a method of generating a photopeak location from coincidence acquisition data, in accordance with some embodiments.

FIG. 7 illustrates a method 450 of generating a photopeak location from coincidence acquisition data, in accordance with some embodiments. At step 452, the nuclear imaging device 10 is initiated in a coincidence acquisition mode. The coincidence acquisition mode can correspond to a selected modality (e.g., PET, CT, etc.) and/or can correspond to a calibration mode of the nuclear imaging device 10. At step 454, each of the crystals 52 in one or more detectors 50 detect a plurality of events. Each detected event generates a signal that is provided to the computer 30. The computer 30 stores each of the signals using energy information in a listmode file. In some embodiments, the resolution of the energy information is determined by the number of bits in an analog-to-digital converter (ADC) included in the detector 50, an available number of bits in a listmode packet, etc.

At step 456, an energy spectrum is generated for each of the crystals 52. The energy spectrum can be generated by grouping (or binning) each of the detected events into one of a plurality of bins. For example, in some embodiments, a histogram using 4 bins is applied to generate a crystal energy spectrum. In other embodiments, crystal energy information is histogrammed into a predetermined number of bins, such as 256 bins. Although embodiments are discussed herein having a predetermined number of bins, it will be appreciated that any number of bins can be used. In some embodiments, a higher number of bins provides a higher resolution to quantify one or more shifts in photopeak location.

At step 458, a photopeak is calculated for each of the crystals 52. The photopeak is calculated from the energy spectrum. For example, in some embodiments, the photopeak is calculated by a higher-order polynomial fit, a Gaussian fit, and/or any other suitable method.

Figure 8:
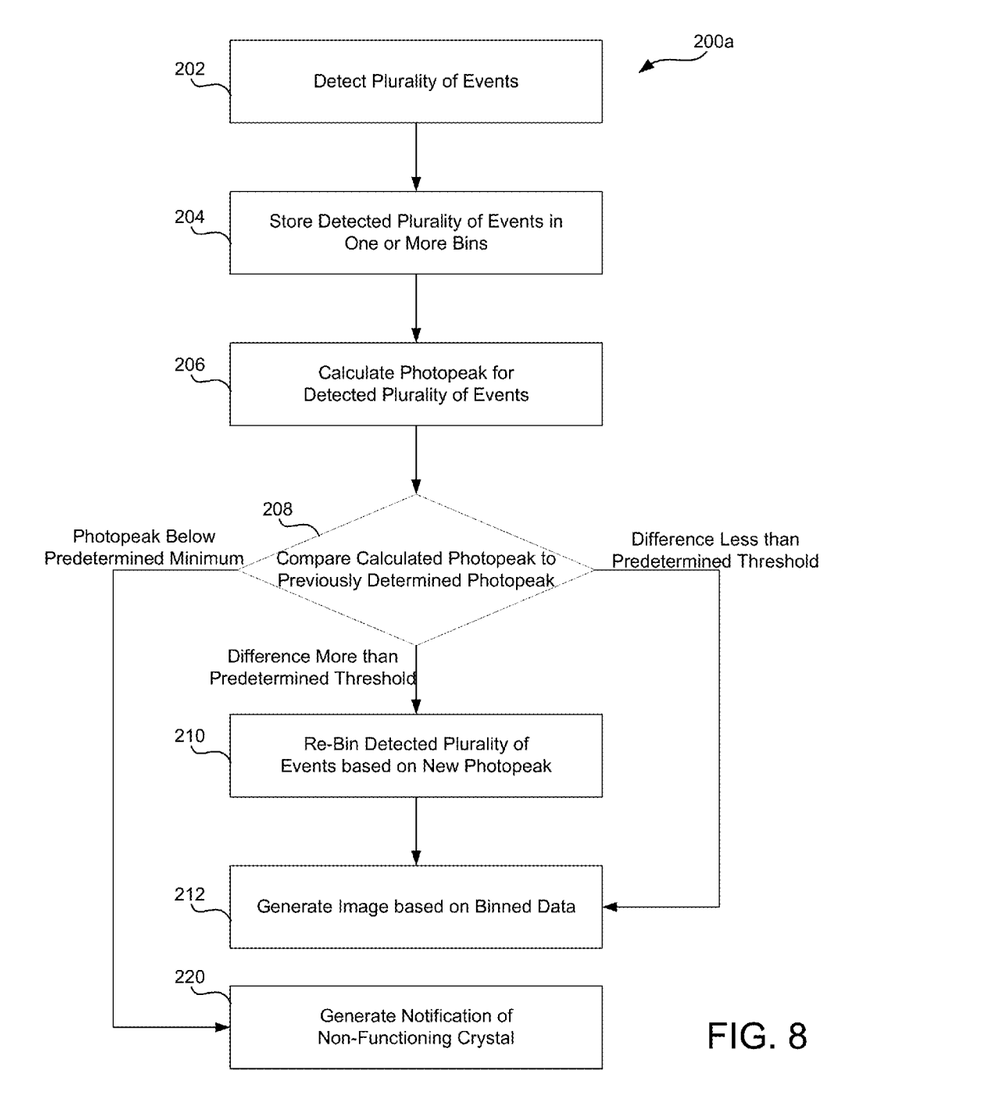
FIG. 8 is a flow chart illustrating a method of monitoring and correcting photopeak variations in a nuclear imaging system, in accordance with some embodiments.

FIG. 8 illustrates a method 200a for monitoring and correcting detectors during an imaging scan, in accordance with some embodiments. The method 200a is similar to the method 200 discussed above, and similar description is not repeated herein. In some embodiments, at step 210a, calculation of a photopeak location for a selected crystal may result in a photopeak below a minimum predetermined threshold, indicating a low-sensitivity (i.e., dead) crystal in the detector 50. In some embodiments, if a low-sensitivity crystal is detected (for example, based on a predetermined minimum threshold such as an integrated crystal count), the method 200a proceeds to step 220. At step 220, the computer 30 generates a notification. The notification can be provided to the operator of the nuclear imaging device 10, the manufacture of the nuclear imaging device 10, and/or any other suitable entity. In some embodiments, the computer 30 can ignore and/or discard all data generated by the dead crystal to avoid artifacts in a generated image. In some embodiments, dead-crystal correction methods can be applied to fill gaps to prevent artifacts in the generated image.

In various embodiments, environmental factors, such as temperature, humidity, etc. can affect the photopeak location of each of the crystals 52. In some embodiments, the computer 130 is configured to tag or otherwise associate frame data with corresponding environmental factors.

Figure 9:
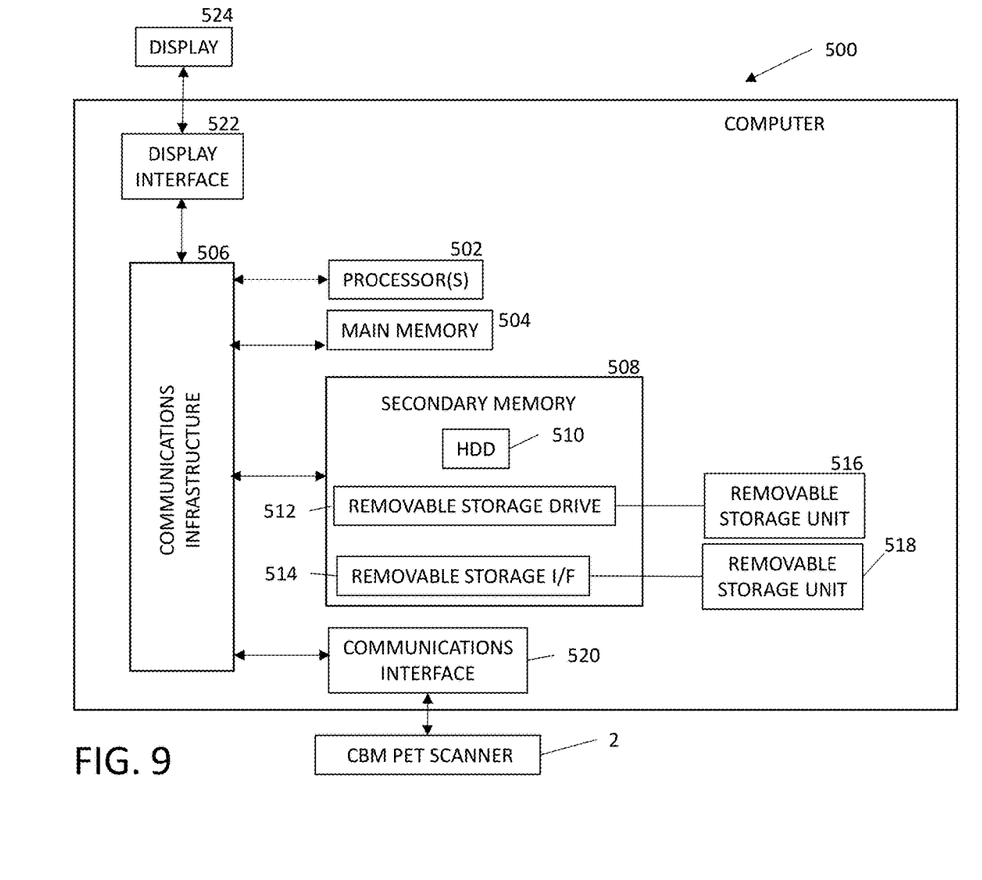
FIG. 9 is a block diagram of a computer system, in accordance with some embodiments.

FIG. 9 is a block diagram of a system 500 including the nuclear imaging detector 2 and a computer system 500. The computer system 500 can be used in some embodiments, e.g., for implementing the system 30 controlling the nuclear imaging detector 2. Computer system 500 may include one or more processors 502. Each processor 502 is connected to a communication infrastructure 506 (e.g., a communications bus, cross-over bar, or network). The processor 500 can be implemented as a central processing unit, an embedded processor or microcontroller, or an application-specific integrated circuit (ASIC). Computer system 500 may include a display interface 522 that forwards graphics, text, and other data from the communication infrastructure 506 (or from a frame buffer, not shown) for display on the display unit 524 to a user.

Computer system 500 may also include a main memory 504, such as a random access memory (RAM), and a secondary memory 508. The main memory 504 and/or the secondary memory 508 comprise a dynamic random access memory (DRAM). The secondary memory 508 may include, for example, a hard disk drive (HDD) 910 and/or removable storage drive 512, which may represent a solid state memory, an optical disk drive, a flash drive, a magnetic tape drive, or the like. The removable storage drive 512 reads from and/or writes to a removable storage unit 516. Removable storage unit 516 may be an optical disk, magnetic disk, floppy disk, magnetic tape, or the like. The removable storage unit 516 may include a computer readable storage medium having tangibly stored therein (or embodied thereon) data and/or computer software instructions, e.g., for causing the processor(s) to perform various operations.

In alternative embodiments, secondary memory 508 may include other devices for allowing computer programs or other instructions to be loaded into computer system 500. Secondary memory 508 may include a removable storage unit 518 and a corresponding removable storage interface 514, which may be similar to removable storage drive 512, with its own removable storage unit 516. Examples of such removable storage units include, but are not limited to, universal serial bus (USB) or flash drives, which allow software and data to be transferred from the removable storage unit 516, 518 to computer system 500.

Computer system 500 may also include a communications interface (e.g., networking interface) 520. Communications interface 520 allows instructions and data to be transferred between computer system 500 and nuclear imaging detector 2. Communications interface 520 also provides communications with other external devices. Examples of communications interface 520 may include a modem, Ethernet interface, wireless network interface (e.g., radio frequency, IEEE 802.11 interface, Bluetooth interface, or the like), a Personal Computer Memory Card International Association (PCMCIA) slot and card, or the like. Instructions and data transferred via communications interface 520 may be in the form of signals, which may be electronic, electromagnetic, optical, or the like that are capable of being received by communications interface 520. These signals may be provided to communications interface 520 via a communications path (e.g., channel), which may be implemented using wire, cable, fiber optics, a telephone line, a cellular link, a radio frequency (RF) link and other communication channels.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific In various embodiments, normalization and/or dead time correction can be applied to the processed imaging data. For example, in various embodiments, dead time correction can be applied after re-processing (or re-binning) image data acquired during one or more frames. The dead time correction can include extracting of a crystal singles count rate from random signals and characterization of crystals in the detector based on the count rate. The characterization includes incorporation of symmetry in the detector and estimations of the characterization curves for each of the crystals in a detector. In some embodiments, detectors (and symmetrically opposed detectors) that are determined to be non-operational during re-processing are excluded. The dead time characterization can be performed in a sinogram domain, an image domain, and/or any other suitable domain.

The previous description of embodiments is provided to enable any person skilled in the art to practice the disclosure. The various modifications to these embodiments will be readily apparent to those skilled in the art, and the generic principles defined herein may be applied to other embodiments without the use of inventive faculty. The present disclosure is not intended to be limited to the embodiments shown herein, but is to be accorded the widest scope consistent with the principles and novel features disclosed herein.

What is claimed is:
1. A method, comprising:
obtaining a first photopeak location for at least one crystal in a detector;
receiving image data from the at least one crystal, wherein the at least one crystal generates the image data during a current imaging procedure;
processing the image data using the first photopeak location;
determining a second photopeak location for the at least one crystal, wherein the second photopeak location is determined from the image data;
determining a difference between the first photopeak location and the second photopeak location;
reprocessing the image data using the second photopeak location when the difference between the first photopeak location and the second photopeak location exceeds a predetermined threshold; and
generating an image using the image data.
2. The method of claim 1, wherein generating the second photopeak location includes measuring an energy response of the first crystal during the current imaging procedure.
3. The method of claim 2, wherein the first photopeak location is obtained from image data generated during a prior imaging procedure.
4. The method of claim 1, comprising:
determining an energy window of the first photopeak location and an energy window of the second photopeak location; and
comparing the energy window of the first photopeak location and the energy window of the second photopeak location to determine the difference between the first photopeak location and the second photopeak location.
5. The method of claim 1, wherein the image data comprises a plurality of detected annihilation events, and wherein processing the image data using the first photopeak location comprises binning each of the plurality of detected annihilation events into one of a first plurality of bins determined based on the first photopeak location.
6. The method of claim 5, wherein reprocessing the image data using the second photopeak location comprises binning each of the plurality of detected annihilation events into one of a second plurality of bins determined based on the second photopeak location.
7. The method of claim 1, wherein the second photopeak location is determined from the image data based on one of a higher-order polynomial fit or a Gaussian fit.
8. The method of claim 1, wherein the first photopeak location is obtained from image data generated during a first time period of the imaging procedure and the second photopeak location is determined based on image data generated during a second time period of the imaging procedure, wherein the first time period occurs prior to the second time period.
9. The method of claim 1, comprising characterizing deadtime of the detector by estimating a characterization curve for each crystal in the detector.
10. The method of claim 1, comprising measuring at least one environmental factor, wherein imaging data is associated with the at least one environmental factor.
11. The method of claim 1, wherein the image is generated using coincidence data.
12. A system, comprising:
a gantry sized and configured to receive a patient;
a scanner including at least one imaging modality configured to detect a plurality of photon events, the at least one imaging modality comprising a plurality of detectors, each of the detectors comprising a plurality of crystals; and a computer in data communication with the at least one imaging modality and configured to process data for medical imaging, wherein the computer is configured to:
receive data indicative of a first plurality of events detected by a plurality of crystals;
generate first photopeak locations for each of the plurality of crystals from the first plurality of events;
receive data indicative of a second plurality of events detected by the plurality of crystals;
process the second plurality of events using the first photopeak location;
generate second photopeak locations for each of the plurality of crystals from the second plurality of events;
determine a difference between the first photopeak location and the second photopeak location for each of the plurality of crystals;
reprocess a subset of the second plurality of events corresponding to a selected one of the plurality of crystals using the second photopeak location when the difference between the first photopeak location and the second photopeak location for the selected one of the plurality of crystals exceeds a predetermined threshold; and
generate an image using at least the second plurality of events.

13. The system of claim 12, wherein generating the second photopeak location includes measuring an energy response of each of the plurality of crystals during the second plurality of events.

14. The system of claim 12, wherein the first plurality of events corresponds to a first imaging procedure and the second plurality of events corresponds to a second imaging procedure.

15. The system of claim 12, wherein the first plurality of events corresponds to a first time portion of an imaging procedure and the second plurality of events corresponds to a second time portion of the imaging procedure.

16. The system of claim 12, wherein processing the second plurality of events using the first photopeak location comprises binning each of the second plurality of events into one of a first plurality of bins determined based on the first photopeak location.

17. The method of claim 15, wherein reprocessing the second plurality of events using the second photopeak location comprises binning each of the plurality of events into one of a second plurality of bins determined based on the second photopeak location.

18. The system of claim 16, wherein the first plurality of events and the second plurality events each include events selected from the group consisting of coincidence events, singles events, and random events.

19. The system of claim 12, wherein the first photopeak location and the second photopeak location are determined from based on one of a higher-order polynomial fit or a Gaussian fit.

20. A non-transitory, computer-readable medium encoded with computer executable instructions which cause a computer to execute the steps of:
receiving a first set of event data for at least one detector of an imaging device, wherein the at least one detector comprises a plurality of crystals;
generating a first photopeak location for each of the plurality of crystals based on the first set of event data;
receiving a second set of event data for the at least one detector of the imaging device;
generating a second photopeak location for each of the plurality of crystals based on the second set of event data;
determining a difference between the first photopeak location and the second photopeak location for each of the plurality of crystals;
processing the second set of event data, wherein the second set of event data is processed using the first photopeak location if the difference between the first photopeak location and the second photopeak location is below a predetermined value, and wherein the second set of event data is processed using the second photopeak location if the difference between the first photopeak location and the second photopeak location is above a predetermined value;
generating an image using the second set of event data.

* * * * *